United States Patent
Choi (10) Patent No.: US 12,237,748 B2
(45) Date of Patent: Feb. 25, 2025

(54) MOTOR HAVING SHIELD TERMINAL

(71) Applicant: LG INNOTEK CO., LTD., Seoul (KR)

(72) Inventor: Dae Ho Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 290 days.

(21) Appl. No.: 17/758,372

(22) PCT Filed: Dec. 2, 2020

(86) PCT No.: PCT/KR2020/017461
§ 371 (c)(1),
(2) Date: Jul. 5, 2022

(87) PCT Pub. No.: WO2021/137452
PCT Pub. Date: Jul. 8, 2021

(65) Prior Publication Data
US 2023/0035697 A1    Feb. 2, 2023

(30) Foreign Application Priority Data

Jan. 2, 2020   (KR) .................. 10-2020-0000443

(51) Int. Cl.
*H02K 5/22* (2006.01)
*H02K 1/12* (2006.01)
(Continued)

(52) U.S. Cl.
CPC ............... *H02K 5/225* (2013.01); *H02K 1/12* (2013.01); *H02K 1/22* (2013.01); *H02K 7/003* (2013.01)

(58) Field of Classification Search
CPC ............ H02K 5/225; H02K 1/12; H02K 1/22; H02K 7/003; H02K 5/04; H02K 2203/09; H02K 11/40; H02K 3/505
(Continued)

(56) References Cited

U.S. PATENT DOCUMENTS 4,323,804 A * 4/1982 Zelt .................. H02K 11/0141
                                                          310/72
5,245,237 A * 9/1993 Fisher ................ H02K 11/25
                                                          310/89
(Continued)

FOREIGN PATENT DOCUMENTS

CN          105337458 A      2/2016
JP          4-35356 U        3/1992
(Continued)

OTHER PUBLICATIONS

Supplementary European Search Report dated May 26, 2023 in European Application No. 20909432.5.
(Continued)

*Primary Examiner* — Ahmed Elnakib
(74) *Attorney, Agent, or Firm* — Saliwanchik, Lloyd & Eisenschenk (57) ABSTRACT

In an embodiment, a motor is disclosed, comprising: a housing; a cover disposed on top of the housing; a stator disposed inside the housing; a rotor disposed inside the stator; a shaft coupled to the rotor; and a connector disposed on top of the cover, wherein the connector comprises: a connector body; and a shield terminal disposed on the connector body so as to be partially exposed, wherein the cover is formed of a metal material, and wherein the shield terminal is inserted into a hole in the cover so as to come into contact therewith. Accordingly, by using the shield terminal including a curved surface and the hole formed in the cover, a gripping force of the motor can be improved.

13 Claims, 9 Drawing Sheets

(51) Int. Cl.
*H02K 1/22* (2006.01)
*H02K 7/00* (2006.01)

(58) Field of Classification Search
USPC .............................................. 310/216.001, 51
See application file for complete search history.

(56) References Cited

U.S. PATENT DOCUMENTS

| | | | | |
|---|---|---|---|---|
| 6,078,117 | A * | 6/2000 | Perrin | H02K 5/1672 |
| | | | | 310/239 |
| 2009/0160268 | A1 * | 6/2009 | Ragnone | H02K 11/40 |
| | | | | 310/239 |
| 2013/0035697 | A1 * | 2/2013 | Ogawa | A61B 34/37 |
| | | | | 606/130 |
| 2014/0049126 | A1 * | 2/2014 | Jiang | H02K 11/026 |
| | | | | 310/72 |
| 2016/0181883 | A1 * | 6/2016 | Yamasaki | H02K 11/33 |
| | | | | 310/68 D |
| 2018/0301961 | A1 * | 10/2018 | Fukunaga | H02K 5/161 |

FOREIGN PATENT DOCUMENTS

| | | |
|---|---|---|
| JP | 2002-320357 A | 10/2002 |
| JP | 2003-332719 A | 11/2003 |
| JP | 2010-28925 A | 2/2010 |
| JP | 2012-157228 A | 8/2012 |
| KR | 10-2017-0050928 A | 5/2017 |
| KR | 10-2019-0054402 A | 5/2019 |

OTHER PUBLICATIONS

International Search Report dated Mar. 22, 2021 in International Application No. PCT/KR2020/017461.

* cited by examiner

MOTOR HAVING SHIELD TERMINAL

CROSS-REFERENCE TO RELATED APPLICATIONS

This application is the U.S. national stage application of International Patent Application No. PCT/KR2020/017461, filed Dec. 2, 2020, which claims the benefit under 35 U.S.C. § 119 of Korean Application No. 10-2020-0000443, filed Jan. 2, 2020, the disclosures of each of which are incorporated herein by reference in their entirety.

TECHNICAL FIELD

The present invention relates to a motor.

BACKGROUND ART

Motors are apparatuses configured to convert electrical energy to mechanical energy to obtain rotational forces and are widely used for vehicles, home appliances, industrial machines, and the like.

Particularly, the motor may be applied to an active roll stabilizer (ARS). In this case, the ARS may be a device which adjusts a stabilizer bar to improve safety and ride comfort. Specifically, the ARS may be a device which adjusts a degree of torsion of the stabilizer to improve turning safety of the vehicle when a vehicle is turned.

The motor may include a housing, a shaft, a stator disposed on an inner circumferential surface of the housing, a rotor installed on an outer circumferential surface of the shaft, a busbar disposed on the stator, and the like. In this case, the stator induces an electrical interaction with the rotor to induce rotation of the rotor.

In this case, the motor may be grounded using a wire or the like extending to a bolting region. However, when the separate wire or the like is used, there is a risk of disconnection, interference between the wire and other components of the motor may occur. Accordingly, the motor may include a shield terminal to be grounded. In this case, the shield terminal may be a ground terminal provided to reduce noise against sensing when the sensing for electronic controlling is performed.

In this case, the shield terminal may be formed of a low resistance material such as gold, silver, or copper. However, since the gold, silver, copper, or the like is material having ductility, an additional fixing method or structure is required.

Accordingly, when the shield terminal of the motor is structurally or mechanically implemented, a ground structure in consideration of the ductile material of the shield terminal and contact of the shield terminal is required.

Technical Problem

The present invention is directed to providing a motor including a shield terminal with improved ground performance.

Objectives to be solved by the present invention are not limited to the above-described objectives, and other objectives which are not described above will be clearly understood by those skilled in the art through following descriptions.

Technical Solution

One aspect of the present invention provides a motor including a housing, a cover disposed on the housing, a stator disposed inside the housing, a rotor disposed inside the stator, a shaft coupled to the rotor, and a connector disposed on the cover, wherein the connector includes a connector body and a shield terminal disposed on the connector body so that a part of the shield terminal is exposed, the cover is formed of a metal material, and the shield terminal is inserted into and in contact with a hole of the cover.

The shield terminal may include a first region, a second region extending from an end portion of the first region in an axial direction, a third region extending from an end portion of the second region to have a curved surface, and a fourth region extending from an end portion of the third region, wherein the curved surface may be is disposed in contact with an inner circumferential surface of the hole. In addition, when the curved surface is in contact with the inner circumferential surface of the hole, the fourth region may be in contact with a corner at a lower side of the hole.

Before the cover and the connector are coupled, the fourth region may be disposed apart from the second region in the axial direction.

Before the cover and the connector are coupled, the fourth region may be disposed on a virtual line (L) on the basis of the virtual line (L) passing through the second region in the axial direction.

In addition, the hole may be formed to have a circular horizontal cross section, and the shield terminal may be formed by bending a plate shaped member. In this case, the hole may be formed in a tapered shape. In this case, sine the inner circumferential surface of the hole formed in the tapered shape is in slidable contact with the curved surface, deformation of the shield terminal may be more easily induced.

The cover may include a cover body, a first cover protruding part extending to protrude upward from an outer circumference of the cover body in the axial direction, a second cover protruding part extending to protrude downward from the cover body in the axial direction, and a hole formed to pass through the cover body in the axial direction, wherein a bearing may be disposed inside the second cover protruding part.

The motor may further include a busbar disposed on the stator, wherein the busbar may include a busbar body and a plurality of busbar terminals disposed on the busbar body, and an end portion of each of the busbar terminals disposed to pass through the cover may be electrically connected to a power terminal of the connector.

Advantageous Effects

According to embodiments, a grounding force can increase using a shield terminal, which includes a curved surface, and a hole formed in a cover.

In addition, according to the embodiments, two-point contact can be implemented by inducing deformation of the shield terminal using a coupling force of the cover and a connector. Accordingly, ground capability of the shield terminal can be further improved.

Various useful advantages and effects of the embodiments are not limited the above-described content and may be more easily understood while the specific embodiments are described.

DESCRIPTION OF DRAWINGS

FIGS. 8A and 8B are views illustrating layouts and structures of the cover and the connector which are disposed in the motor according to the embodiment, wherein

MODES OF THE INVENTION

Hereinafter, exemplary embodiments of the present invention will be described in detail with reference to the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Figure 1:
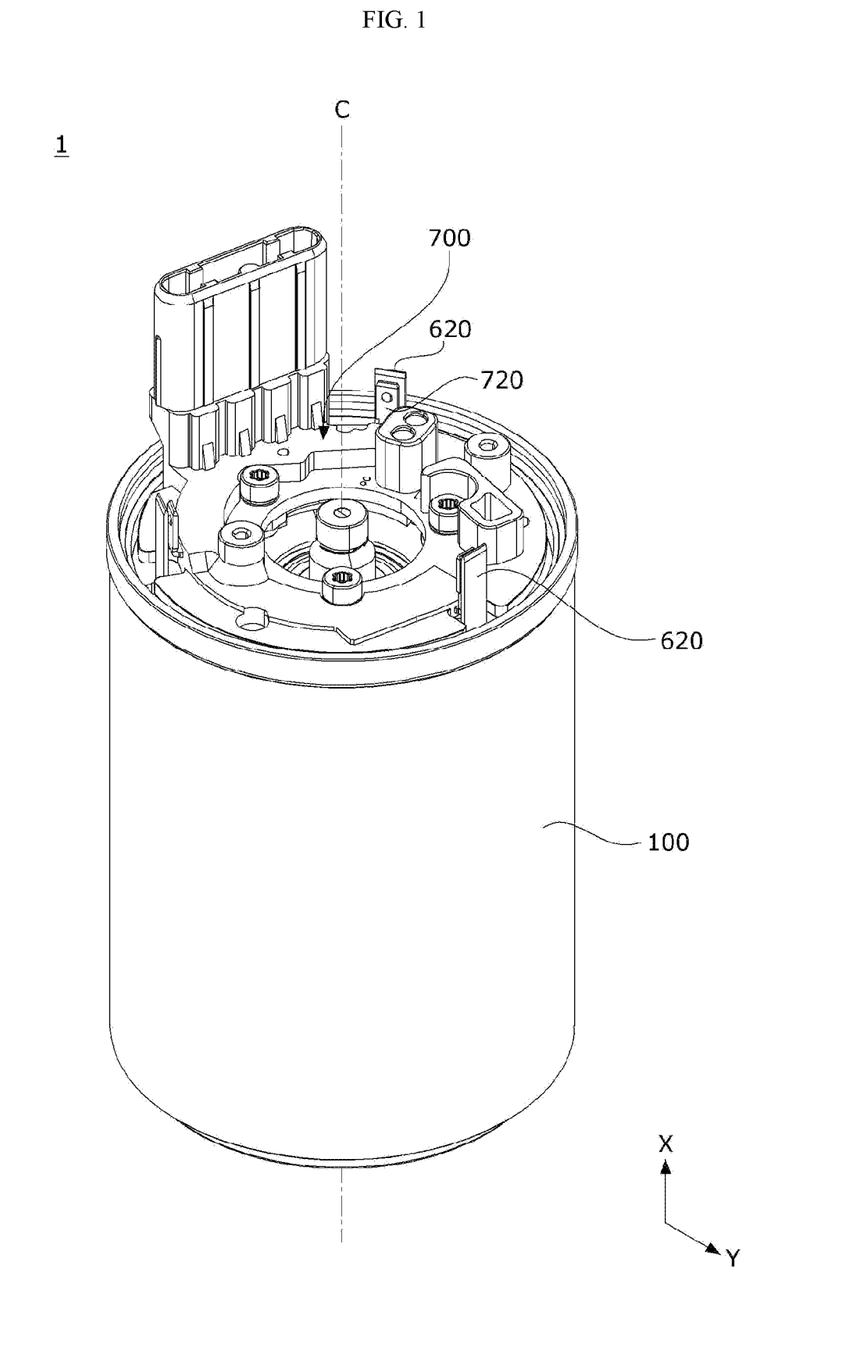
FIG. 1 is a perspective view illustrating a motor according to an embodiment.
Figure 2:
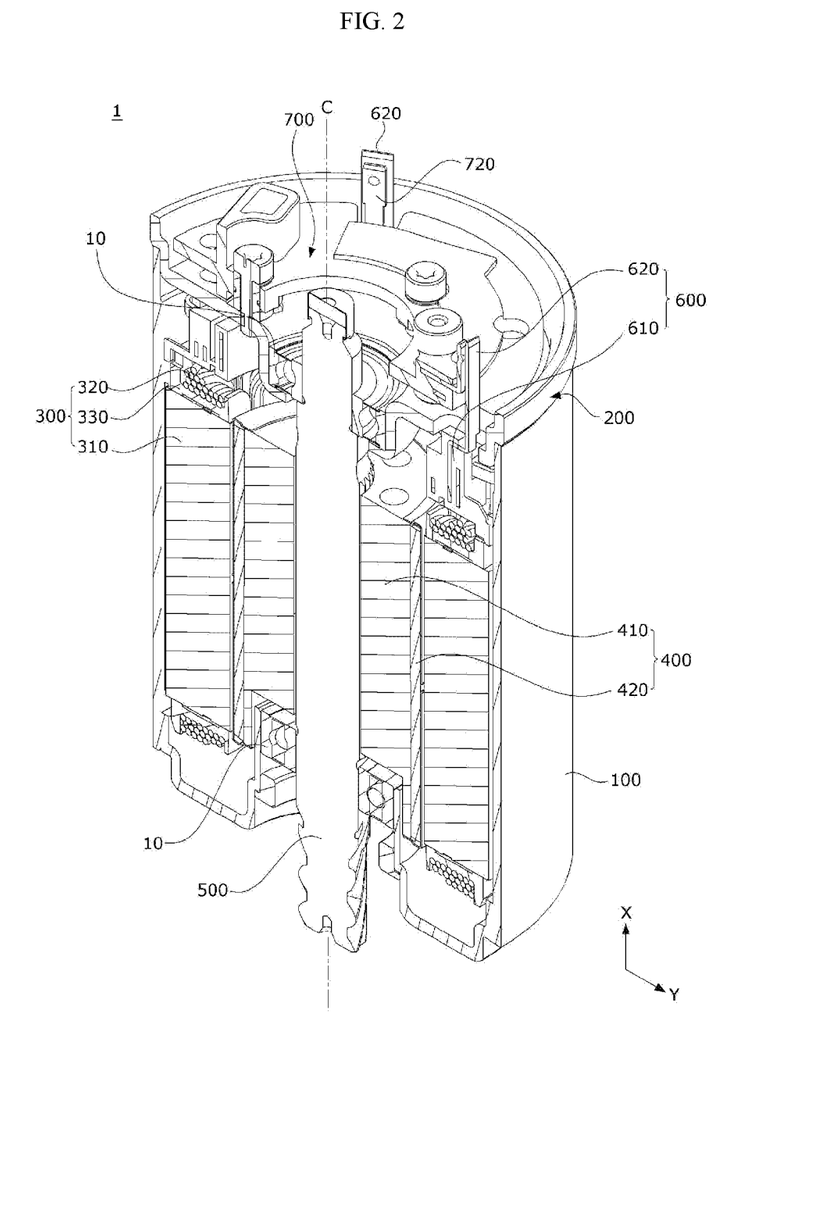
FIG. 2 is a cross-sectional perspective view illustrating the motor according to the embodiment.
Figure 3:
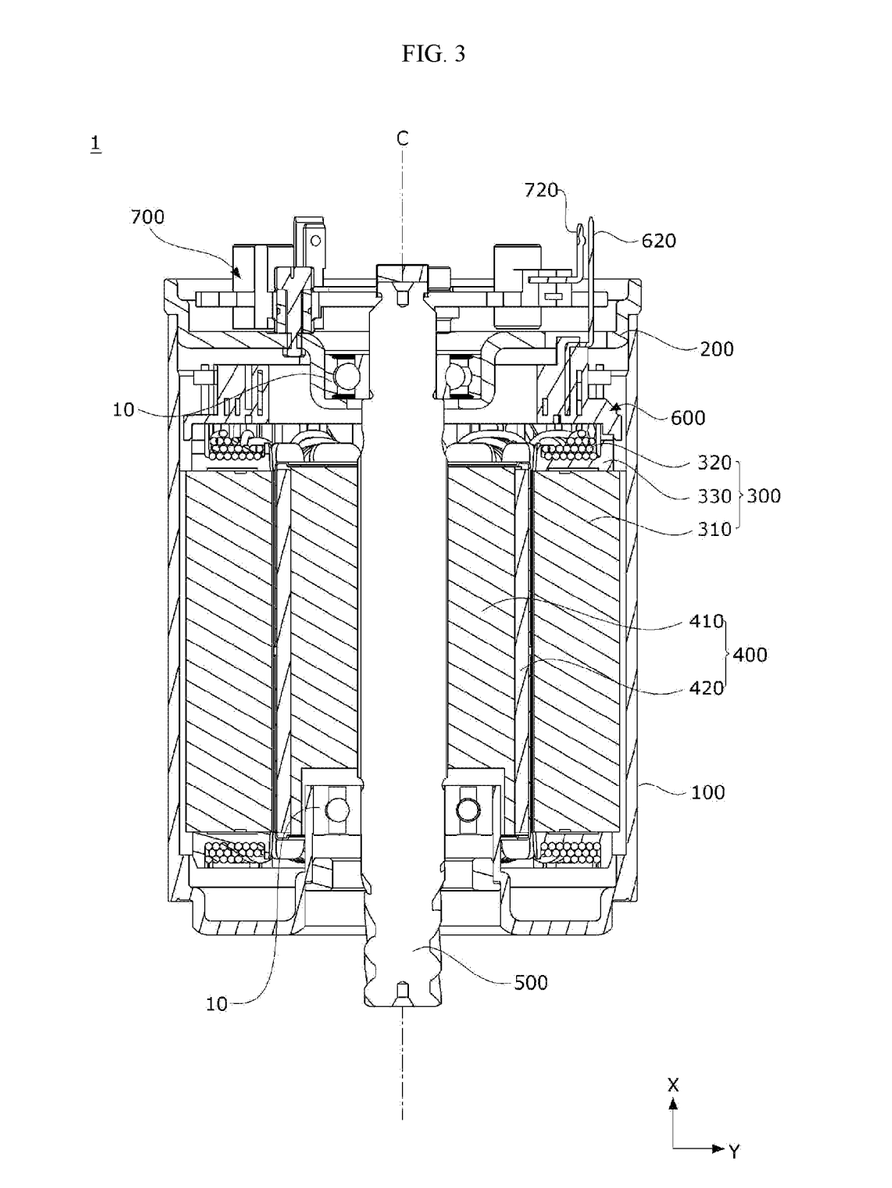
FIG. 3 is a cross-sectional view illustrating the motor according to the embodiment.

FIG. 1 is a perspective view illustrating a motor according to an embodiment, FIG. 2 is a cross-sectional perspective view illustrating the motor according to the embodiment, and FIG. 3 is a cross-sectional view illustrating the motor according to the embodiment. In FIGS. 1 to 3, an x direction may be an axial direction, and a y direction may be a radial direction. In addition, the axial direction and the radial direction may be perpendicular to each other. In this case, the axial direction may be a longitudinal direction of the shaft 500.

A motor 1 according to the embodiment may include a housing 100 having one side at which an opening is formed, a cover 200 disposed on the housing 100, a stator 300 disposed in the housing 100, a rotor 400 disposed inside the stator 300, a shaft 500 which rotates along with the rotor 400, a busbar 600 disposed on the stator 300, and a connector 700 disposed on the stator 300. In this case, the term "inward" may be a direction toward a center C, and the term "outward" may be a direction opposite to "inward."

The motor 1 may be a motor used in an active roll stabilizer (ARS).

The housing 100 and the cover 200 may form an exterior of the motor 1. In addition, an accommodation space may be formed by coupling the housing 100 and the cover 200. Accordingly, as illustrated in FIG. 1, the stator 300, the rotor 400, the shaft 500, and the like may be disposed in the accommodation space. In this case, the shaft 500 is rotatably disposed in the accommodation space. Accordingly, the motor 1 may further include bearings 10 disposed on upper and lower portions of the shaft 500.

The housing 100 may be formed in a cylindrical shape. In addition, the housing 100 may accommodate the stator 300, the rotor 400, and the like therein. In this case, a shape or material of the housing 100 may be variously changed. For example, the housing 100 may be formed of a metal material which firmly withstands even at high temperatures.

The cover 200 may be disposed on an open surface of the housing 100, that is, on the housing 100, to cover the opening of the housing 100. In this case, the cover 200 may be formed of a metal material.

Figure 4:
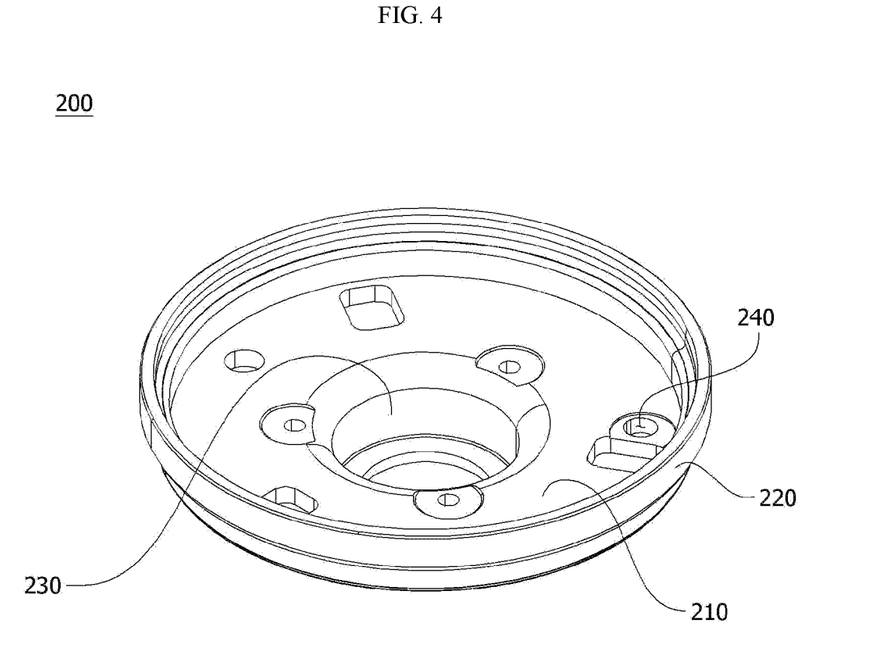
FIG. 4 is a view illustrating a cover disposed in the motor according to the embodiment.

FIG. 4 is a view illustrating the cover disposed in the motor according to the embodiment.

Referring to FIG. 4, the cover 200 may include a cover body 210, a first cover protruding part 220, a second cover protruding part 230, and a hole 240 formed for grounding. In this case, the cover body 210, the first cover protruding part 220, and the second cover protruding part 230 may be integrally formed.

The cover body 210 may serve as a cover which covers the opening of the housing 100. Accordingly, the cover body 210 may be disposed on the open surface of the housing 100, that is, on an upper portion of the housing 100.

The first cover protruding part 220 may be formed to protrude in an upward direction, which is one direction of the axial direction, from an outer circumference or edge of the cover body 210. Accordingly, the first cover protruding part 220 may guide an arrangement of the connector 700. In this case, the first cover protruding part 220 may be referred to as a wall.

The second cover protruding part 230 may be formed to protrude in a downward direction, which is the other direction of the axial direction, from a central portion of the cover body 210. Accordingly, the bearing 10 may be disposed inside the second cover protruding part 230. In this case, the second cover protruding part 230 may be referred to as a bearing accommodation part or cover pocket part. In addition, the second cover protruding part 230 may include the hole formed in the central portion to arrange the shaft 500.

The hole 240 may be formed in the cover body 210 to pass through the cover body 210 in the axial direction. In addition, one side of a shield terminal 730 may be disposed in contact with an inner circumferential surface 241 of the hole 240.

The stator 300 may be disposed inside the housing 100. In this case, the stator 300 may be supported by an inner circumferential surface of the housing 100. In addition, the stator 300 may be disposed outside the rotor 400. That is, the rotor 400 may be rotatably disposed inside the stator 300.

Referring to FIG. 2, the stator 300 may include a stator core 310, coils 320 wound around the stator core 310, and an insulator 330 disposed between the stator core 310 and the coils 320.

The coils 320 which generate a rotating magnetic field may be wound around the stator core 310. In this case, the stator core 310 may be formed as one core or formed by coupling a plurality of divided cores.

In addition, the stator core 310 may be formed in a form in which a plurality of thin steel plates are stacked but is not necessarily limited thereto. For example, the stator core 310 may also be formed as one single part.

The stator core 310 may include a yoke (not shown) having a cylindrical shape and a plurality of teeth (not shown) protruding from the yoke in the radial direction. In addition, the coils 320 may be wound around the teeth.

The insulator 330 insulates the stator core 310 from the coils 320. Accordingly, the insulator 330 may be disposed between the stator core 310 and the coils 320.

Accordingly, the coils 320 may be wound around the teeth of the stator core 310 on which the insulator 330 is disposed.

The rotor 400 may be disposed inside the stator 300. In addition, the shaft 500 may be coupled to a central portion thereof.

The rotor 400 may be formed so that magnets 420 are coupled to the rotor core 410. For example, the rotor 400 may be formed as a type in which the magnets 420 are disposed on an outer circumferential surface of the rotor core 410.

Accordingly, the magnets 420 may generate a rotating magnetic field with the coils 320 wound around the stator 300. The magnets 420 may be disposed so that N-poles and S-poles are alternately positioned in a circumferential direction about the shaft 500.

Accordingly, the rotor 400 rotates due to an electric interaction between the coils 320 and the magnets 420, and when the rotor 400 rotates, the shaft 500 rotates to generate a driving force of the motor 1.

Meanwhile, the rotor core 410 of the rotor 400 may be manufactured by coupling a plurality of divided cores or manufactured as a single core form including one container.

In this case, the rotor core 410 may be formed in a form in which a plurality of thin steel plates are stacked.

As illustrated in FIGS. 1 and 2, the shaft 500 may be disposed in the housing 100 and rotatably supported by the bearings 100. In addition, the shaft 500 may rotate with the rotor 400 in conjunction with the rotation of the rotor 400.

The busbar 600 may be disposed on the stator 300.

In addition, the busbar 600 may be electrically connected to the coils 320 of the stator 300.

The busbar 600 may include a busbar body 610 and a plurality of busbar terminals 620 disposed on the busbar body 610.

The busbar body 610 may be a molded part formed by injection-molding an insulation material. In addition, the busbar body 610 may be formed in an annular shape.

The busbar terminals 620 may be disposed on the busbar body 610 through an injection molding manner. In this case, parts of the busbar terminals 620 may be formed to be exposed at the busbar body 610.

In addition, one sides of the busbar terminals 620 may be electrically connected to the coils 320 of the stator 300. In addition, the other sides of the busbar terminals 620 may be formed to protrude upward to pass through the cover 200. Accordingly, the other sides of the busbar terminals 620 may be connected to power terminals 720 of the connector 700 through fusing.

The connector 700 may be disposed on the cover 200 and coupled to the cover 200 using a coupling member such as a bolt. That is, the motor 1 has an advantage that the shield terminal 730 is naturally grounded to the hole 240 of the cover 200 in a process in which the connector 700 is assembled with the cover 200.

Figure 5:
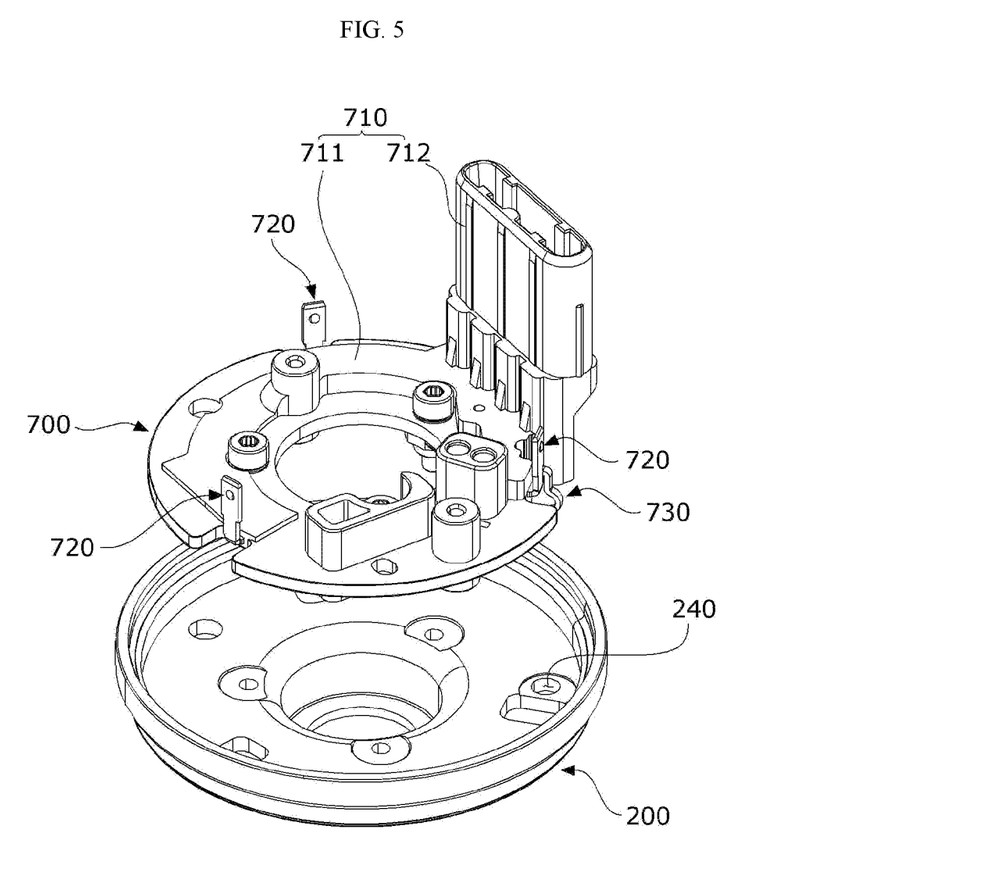
FIG. 5 is an exploded perspective view illustrating an arrangement relationship between the cover and a connector which are disposed in the motor according to the embodiment.
Figure 6:
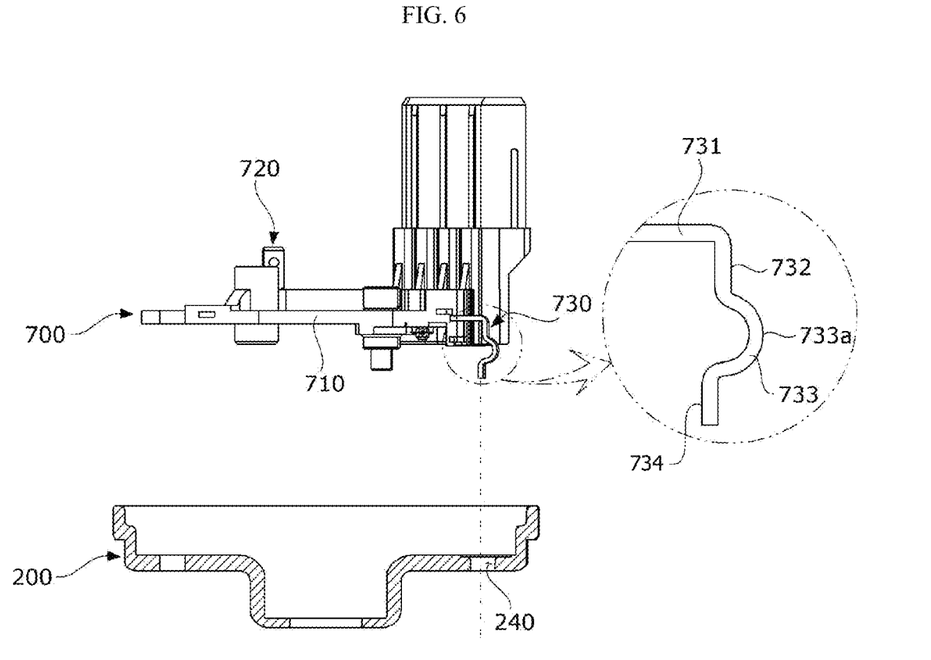
FIG. 6 is a view illustrating a state before the cover and the connector, which are disposed in the motor according to the embodiment, are coupled.
Figure 7:
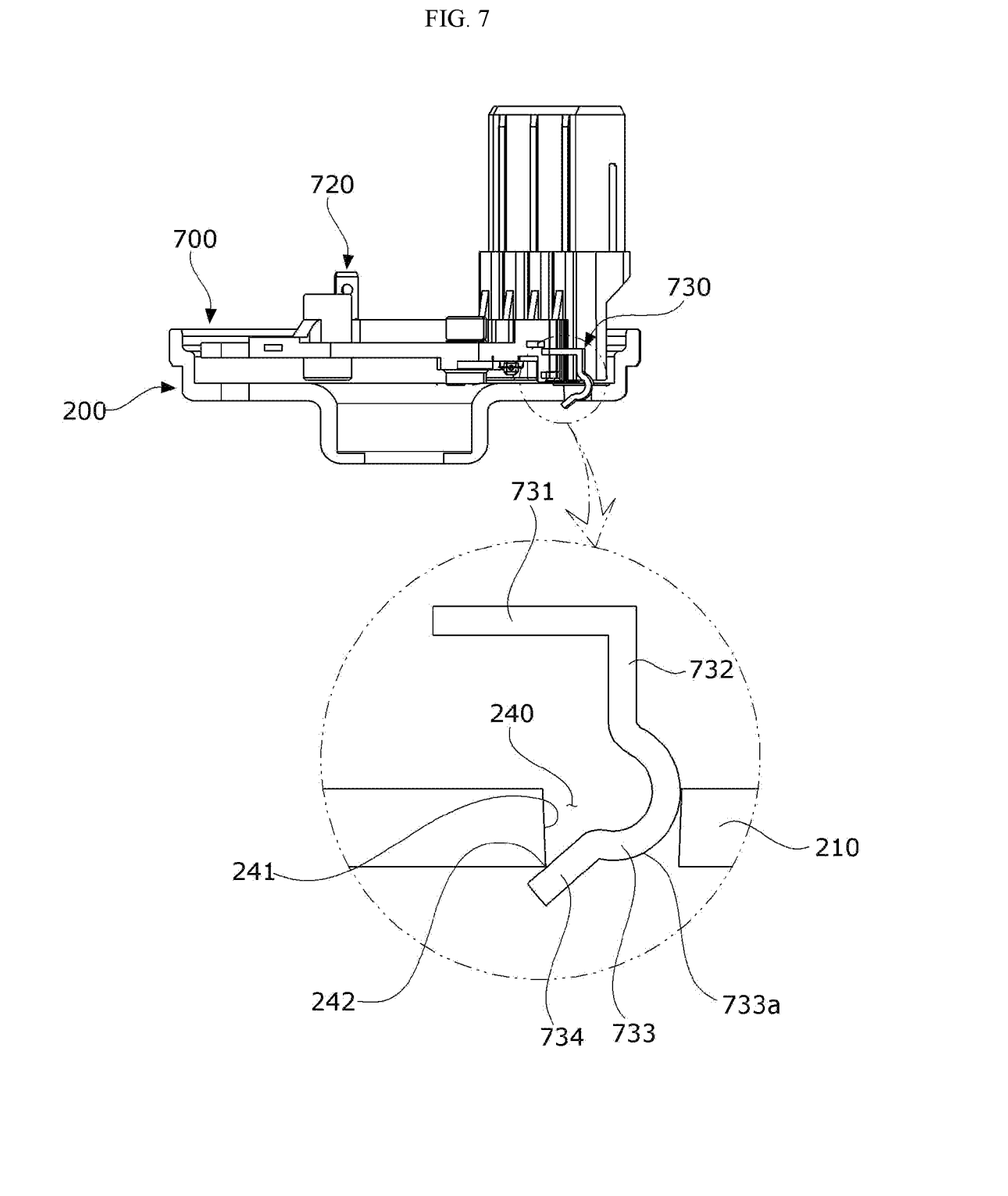
FIG. 7 is a view illustrating a state after the cover and the connector, which are disposed in the motor according to the embodiment, are coupled.

FIG. 5 is an exploded perspective view illustrating an arrangement relationship between the cover and the connector which are disposed in the motor according to the embodiment, FIG. 6 is a view illustrating a state before the cover and the connector, which are disposed in the motor according to the embodiment, are coupled, and FIG. 7 is a view illustrating a state after the cover and the connector, which are disposed in the motor according to the embodiment, are coupled.

Referring to FIGS. 2 and 3 and FIGS. 5 to 7, the connector 700 may be disposed on the cover 200. In addition, the connector 700 may include a connector body 710 and the plurality of power terminals 720 and the shield terminal 730 which are disposed on the connector body 710. In this case, the shield terminal 730 may be referred to as a ground terminal.

Accordingly, the connector 700 may transmit power applied from the outside to the coils 320 using the power terminals 720.

The connector body 710 may be a molded part formed of an insulation material. In this case, the connector body 710 may serve as a frame which combines the power terminals 720 and the shield terminal 730 into one component.

The connector body 710 may include a body part 711 and a connector part 712.

The body part 711 may be disposed on the cover 200.

The connector part 712 may be formed to protrude from the body part 711 in the axial direction. In addition, an external power source may be connected to the connector part 712.

The power terminals 720 and the shield terminal 730 may be disposed on the connector body 710 through injection-molding. In this case, parts of the power terminals 720 and a part of the shield terminal 730 may be disposed to be exposed at connector body 710.

The power terminals 720 allow power applied from the outside to be transmitted to the busbar 600. In this case, the power terminals 720 may be formed of a metal material.

One end portion of each of the power terminals 720 may be disposed to face or be in contact the other side of one of the busbar terminals 620 and be electrically coupled to one of the busbar terminals 620 through fusing or the like.

In addition, at least three power terminals 720 may be formed, and the power terminals 720 may be connected to the busbar terminals 620 of U-, V-, and W-phases.

The shield terminal 730 may be disposed in contact with the cover 200 to be grounded. As illustrated in FIG. 7, an end portion of the shield terminal 730 disposed to be exposed at the connector body 710 may be in contact with the inner circumferential surface 241 of the hole 240 to be grounded.

Referring to FIGS. 6 and 7, the shield terminal 730 may include a first region 731 which is disposed in the radial direction and has one portion disposed on the connector body 710, a second region 732 extending from an end portion of the first region 731 in the axial direction, a third region 733 extending from an end portion of the second region 732 to have a curved surface 733a, and a fourth region 734 extending from an end portion of the third region 733 in the axial direction. In this case, a position of the fourth region 734 may be changed by a reaction force generated by the curved surface 733a being in contact with the inner circumferential surface 241 of the hole 240. Accordingly, the fourth region 734 may be in contact with an edge 242 disposed at a lower side of the hole 240. In this case, the curved surface 733a may be formed to have a predetermined curvature.

As illustrated in FIG. 7, as one region of the third region 733 is bent by the reaction force generated by the inner circumferential surface 241 of the hole 240 being in contact with the curved surface 733a, the position of the fourth region 734 may be changed to be inclined. Accordingly, a two-point contact structure of the shield terminal 730 may be implemented using the fourth region 734 in contact with the edge 242 disposed at the lower side of the hole 240 in addition to the third region 733 in contact with the inner circumferential surface 241 of the hole 240. Specifically, since the curved surface 733a may be formed to have the predetermined curvature, the curved surface 733a of the shield terminal 730 moves downward while being in contact with a corner at an upper side of the inner circumferential surface 241. Accordingly, the shield terminal 730 is bent toward an inner side of the hole 240. In addition, the two-point contact structure of the shield terminal 730 may be implemented using the fourth region 734 in contact with the edge 242 disposed at the lower side of the hole 240 in addition to the third region 733 in contact with the inner circumferential surface 241 of the hole 240.

That is, a part of the curved surface 733a of the third region 733 may be disposed to overlap the hole 240 in the axial direction in a process of assembling the connector 700 and the cover 200. In addition, when the fourth region 734 is guided by the hole 240, since the part of the curved surface 733a of the third region 733 is disposed to overlap the hole 240, the curved surface 733a may be in contact with the inner circumferential surface 241 of the hole 240. In addition, since the one region of the third region 733 is bent by the reaction force generated by the curved surface 733a being in contact with the inner circumferential surface 241 of the hole 240, one side of the fourth region 734 may be in contact with the edge 242 disposed at the lower side of the hole 240.

Accordingly, when the end portion of the shield terminal 730 is inserted into the hole 240 by coupling the cover 200 and the connector 700, since the two-point structure of the shield terminal 730 is implemented due to the reaction force, a grounding force of the shield terminal 730 can be increased. For example, the grounding force of the shield terminal 730 can be increased by implementing the two-point structure through contact between the curved surface 733a and the inner circumferential surface 241 of the hole 240 and contact between the fourth region 734 and the edge 242 disposed at the lower side of the hole 240.

Meanwhile, the hole 240 may be formed to have a circular horizontal cross section. In addition, the shield terminal 730 may be formed by bending a plate shaped member. Accordingly, an edge of the third region 733 at at least one side in the circumferential direction may be in contact with the inner circumferential surface 241 of the hole 240. In addition, an edge of the fourth region 734 at at least one side in the circumferential direction may be in contact with the edge 242 disposed at the lower side of the hole 240 at at least one side.

That is, as the hole 240 is formed in a circular shape, and the shield terminal 730 is formed by bending a plate shaped member, the hole 240 and the shield terminal 730 may be in contact with each other at four points at maximum.

In addition, the shield terminal 730 may be formed of an elastic material, a ductile material, or the like. For example, the shield terminal 730 may be formed of a low resistance material such as gold, silver, and copper to reduce noise interfering with the sensing. Accordingly, a structure of the shield terminal 730 can allow a ground structure to be optimized by variously forming a shape according to a material.

Figure 8A:
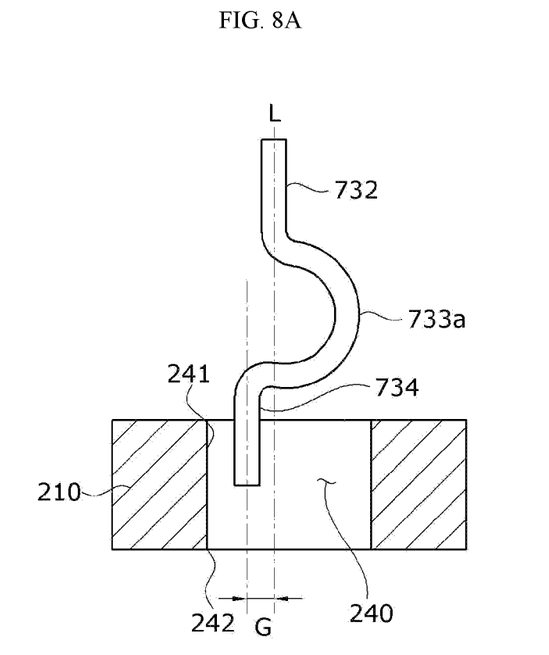
FIG. 8A is the view illustrating a structure of the shield terminal and an arrangement relationship between the shield terminal and the hole before the cover and the connector are coupled when the shield terminal of the connector is formed of a ductile material.
Figure 8B:
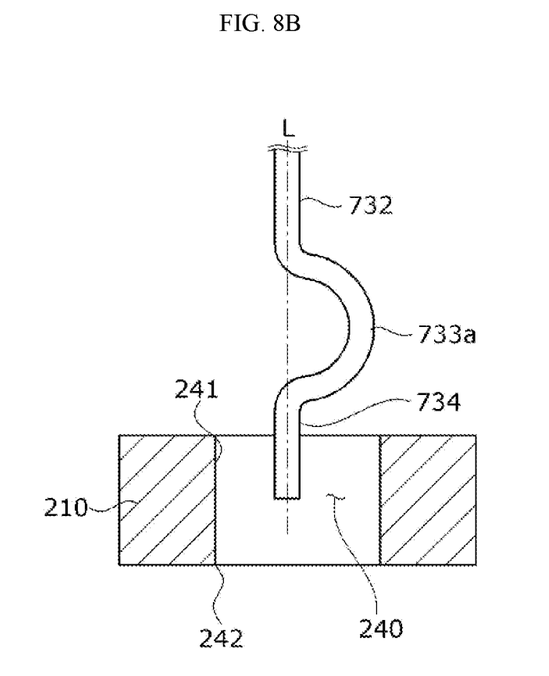
FIG. 8B is the view illustrating a structure of the shield terminal and an arrangement relationship between the shield terminal and the hole before the cover and the connector are coupled when the shield terminal is formed of an elastic material.

FIGS. 8A and 8B are views structures of the connector disposed in the motor according to the embodiment. FIG. 8A is the view illustrating a structure of the shield terminal 730 and an arrangement relationship between the shield 730 and the hole 240 before the cover 200 and the connector 700 are coupled when the shield terminal 730 is formed of a ductile material, and FIG. 8B is the view illustrating a structure of the shield terminal 730 and an arrangement relationship between the shield terminal 730 and the hole 240 before the cover 200 and the connector 700 are coupled when the shield terminal 730 is formed of an elastic material.

In this case, the ductile material may be a material which is deformed without being broken even when receiving a force greater than or equal to that corresponding to an elastic limit of the material. For example, the ductile material may be a material of which a load (reaction force) applied to the curved surface 733a of the shield terminal 730 is greater than that corresponding to an elastic limit. In addition, the elastic material may be a material of which a load (reaction force) applied to the curved surface 733a of the shield terminal 730 is less than that corresponding to an elastic limit.

Accordingly, the ductile material is a material of which deformation remains without returning to an original state even when the reaction force (deforming force) is removed because the reaction force is greater than that corresponding to an elastic limit and may be referred to as a plastic material. In addition, the elastic material is a material which returns to an original state when the reaction force is removed because the reaction force is smaller than that corresponding to an elastic limit and may be referred to as an elastic deformation material.

Referring to FIG. 8A, when the shield terminal 730 is formed of the ductile material, the fourth region 734 may be disposed not to overlap the second region 732 in the axial direction. Accordingly, the fourth region 734 and the second region 732 may be formed to have an offset G in the radial direction. As illustrated in FIG. 8A, the fourth region 734 may be disposed apart from a virtual line L passing through the second region 732 in the axial direction by a distance from the virtual line L. Accordingly, when the third region 733 is deformed, the fourth region 734 can be easily in contact with the edge 242 disposed at the lower side of the hole 240 even when a deformation amount of the third region 733 is smaller than a deformation amount of the third region 733 of the shield terminal 730 formed of an elastic material.

Referring to FIG. 8B, when the shield terminal 730 is formed of the elastic material, the fourth region 734 may be disposed to overlap the second region 732 in the axial direction. Accordingly, the fourth region 734 and the second region 732 may be formed not to have the offset G in the radial direction. As illustrated in FIG. 8B, the fourth region 734 may be disposed on the virtual line L passing through the second region 732 in the axial direction. Accordingly, even when the third region 733 is elastically deformed by the reaction force, the fourth region 734 may be easily in contact with the edge 242 disposed at the lower side of the hole 240.

Figure 9:
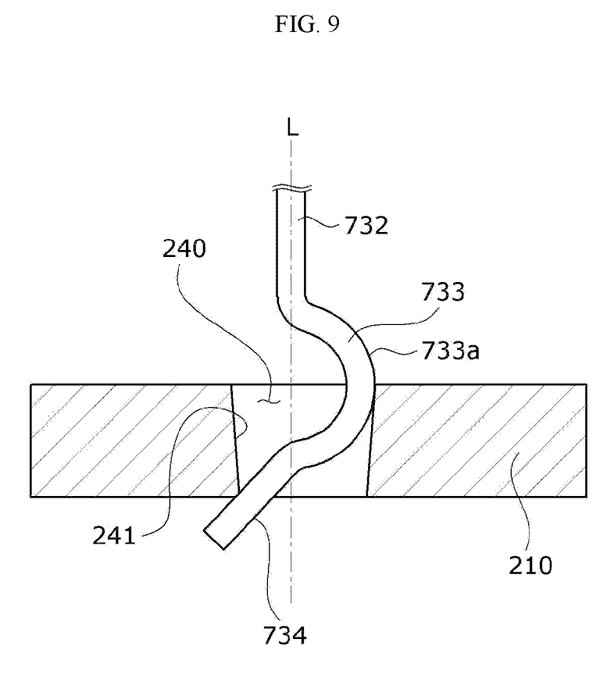
FIG. 9 is a view illustrating a modified example of the cover disposed in the motor according to the embodiment.

FIG. 9 is a view illustrating a modified example of the cover disposed in the motor according to the embodiment.

Referring to FIG. 9, the hole 240 of the cover 200 may be formed in a tapered shape. For example, the hole 240 may be formed in the tapered shape having an upper inner diameter greater than a lower inner diameter. Accordingly, the fourth region 734 may be more easily in contact with the edge 242 disposed at the lower side of the hole 240. For example, since an inner circumferential surface 241 of the hole 240 formed in the tapered shape is in slidable contact with the curved surface 733a, the fourth region 734 may be more easily in contact with the edge 242 disposed at the lower side of the hole 240.

Particularly, when the shield terminal 730 is formed of the ductile material, even when the deformation amount of the third region 733 is smaller than the deformation amount of the third region 733 of the shield terminal 730 formed of the elastic material, due to the tapered shape, the fourth region 734 may be more easily in contact with the edge 242 disposed at the lower side of the hole 240.

While the present invention has been described above with reference to the exemplary embodiments, it may be understood by those skilled in the art that various modifications and changes of the present invention may be made within a range not departing from the spirit and scope of the present invention defined by the appended claims.

[REFERENCE NUMERALS]

1: MOTOR
100: HOUSING
200: COVER
240: HOLE
300: STATOR
310: STATOR CORE
320: COIL
330: INSULATOR
400: ROTOR
500: SHAFT
600: BUSBAR
700: CONNECTOR
730: SHIELD TERMINAL

The invention claimed is:

1. A motor comprising:
a housing;
a cover disposed on the housing;
a stator disposed inside the housing;
a rotor disposed inside the stator;
a shaft coupled to the rotor; and
a connector disposed on the cover,
wherein the connector includes a connector body and a shield terminal disposed on the connector body so that a part of the shield terminal is exposed,
wherein the cover is formed of a metal material,
wherein the shield terminal includes:
  a first region;
  a second region extending from an end portion of the first region in an axial direction;
  a third region extending from an end portion of the second region to have a curved surface; and
  a fourth region extending from an end portion of the third region,
wherein a portion of the third region is bent by a reaction force generated by a contact of an inner circumferential surface of a hole of the cover and the curved surface when the shield terminal is inserted into the hole of the cover, and
wherein a position of the fourth region is changed to be inclined to have a predetermined angle with respect to the axial direction due to the reaction force.

2. The motor of claim 1, wherein, when the curved surface is in contact with the inner circumferential surface of the hole of the cover, the fourth region is in contact with a corner at a lower side of the hole of the cover.

3. The motor of claim 1, wherein the fourth region and the second region are disposed to have an offset.

4. The motor of claim 1, wherein the fourth region is disposed on a virtual line (L) on the basis of the virtual line (L) passing through the second region in the axial direction.

5. The motor of claim 1, wherein:
the hole of the cover is formed to have a circular horizontal cross section; and
the shield terminal is formed by bending a plate shaped member.

6. The motor of claim 5, wherein the hole of the cover is formed in a tapered shape.

7. The motor of claim 6, wherein the inner circumferential surface of the hole of the cover is in slidable contact with the curved surface.

8. The motor of claim 1, wherein the cover includes:
a cover body;
a first cover protruding part extending to protrude upward from an outer circumference of the cover body in the axial direction;
a second cover protruding part extending to protrude downward from the cover body in the axial direction; and
the hole formed to pass through the cover body in the axial direction,
wherein a bearing is disposed inside the second cover protruding part.

9. The motor of claim 1, comprising a busbar disposed on the stator,
wherein the busbar includes a busbar body and a plurality of busbar terminals disposed on the busbar body, and
an end portion of each of the busbar terminals disposed to pass through the cover is electrically connected to a power terminal of the connector.

10. The motor of claim 9, wherein one end portion of the power terminal is disposed to face and be electrically connected to the end portion of the busbar terminal.

11. The motor of claim 1, wherein:
the connector body includes a body part disposed on the cover and a connector part formed to protrude from the body part; and
the connector body is formed of an insulation material.

12. The motor of claim 1, wherein the fourth region of the shield terminal is disposed to be exposed at the connector body and is in contact with the inner circumferential surface of the hole of the cover.

13. The motor of claim 12, wherein the fourth region of the shield terminal is in contact with a corner at a lower side of the hole due to the reaction force.

* * * * *